United States Patent
Massault et al.

(10) Patent No.: US 9,109,773 B2
(45) Date of Patent: Aug. 18, 2015

(54) LIGHT-SIGNALING GLAZING FOR A VEHICLE

(71) Applicant: SAINT-GOBAIN GLASS FRANCE, Courbevoie (FR)

(72) Inventors: Laeticia Massault, Magny les Compiegne (FR); Adele Verrat-Debailleul, Villers-sur-Coudun (FR); Pascal Bauerle, Roye (FR); Sophie Milhe Poutingon, Senlis (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/352,545

(22) PCT Filed: Oct. 31, 2012

(86) PCT No.: PCT/FR2012/052524
§ 371 (c)(1),
(2) Date: Apr. 17, 2014

(87) PCT Pub. No.: WO2013/068678
PCT Pub. Date: May 16, 2013

(65) Prior Publication Data
US 2014/0240997 A1    Aug. 28, 2014

(30) Foreign Application Priority Data
Nov. 7, 2011    (FR) ...................................... 11 60053

(51) Int. Cl.
*F21S 8/10*    (2006.01)
*B32B 17/10*    (2006.01)
(Continued)

(52) U.S. Cl.
CPC ........... *F21S 48/20* (2013.01); *B32B 17/10036* (2013.01); *B32B 17/10348* (2013.01);
(Continued)

(58) Field of Classification Search
USPC ........................................... 362/511, 488, 503
See application file for complete search history.

(56) References Cited

U.S. PATENT DOCUMENTS 5,634,708 A * 6/1997 Koie et al. ...................... 362/503
7,162,840 B1 * 1/2007 Thomas ..................... 52/204.61
(Continued)

FOREIGN PATENT DOCUMENTS

DE    10 2008 004 049    7/2009
EP    1 234 752    8/2002
(Continued)

OTHER PUBLICATIONS

International Search Report issued Dec. 21, 2012 in PCT/FR12/52524 filed Oct. 31, 2012.
(Continued)

*Primary Examiner* — Laura Tso
(74) *Attorney, Agent, or Firm* — Oblon, McClelland, Maier & Neustadt, L.L.P.

(57) ABSTRACT

An illuminated vehicle signaling glazing unit, including: a first transparent sheet made of mineral glass including a first main face configured to be directed toward outside the vehicle, a second main face configured to be directed toward inside the vehicle, and an edge face; one or more light sources, or light-emitting diodes, each including a light-emission face opposite the edge face, light emitted by the light sources being guided into the first sheet between the first and the second main faces thereof; a mechanism extracting light in at least one region of the first or second main faces of the first sheet or within a thickness of the first sheet; and an opaque layer formed from ink or from enamel, situated toward the inside of the vehicle with respect to the extraction mechanism and totally masking the extraction mechanism of the light to render it invisible from inside the vehicle.

15 Claims, 2 Drawing Sheets

(51) Int. Cl.
*B60J 1/10* (2006.01)
*B60Q 1/26* (2006.01)
*B60Q 1/38* (2006.01)
*F21V 8/00* (2006.01)

(52) U.S. Cl.
CPC ............. *B32B17/10541* (2013.01); *B60J 1/10* (2013.01); *B60Q 1/268* (2013.01); *B60Q 1/38* (2013.01); *G02B 6/0035* (2013.01); *G02B 6/0068* (2013.01); *G02B 6/0073* (2013.01)

(56) References Cited

U.S. PATENT DOCUMENTS

| | | |
|---|---|---|
| 2002/0135208 A1 | 9/2002 | Pommeret et al. |
| 2004/0105274 A1 | 6/2004 | Pommeret et al. |
| 2006/0209551 A1* | 9/2006 | Schwenke et al. ............ 362/503 |
| 2007/0210621 A1* | 9/2007 | Barton et al. ................. 296/215 |
| 2012/0320621 A1* | 12/2012 | Kleo et al. .................... 362/558 |
| 2013/0033894 A1* | 2/2013 | Kleo et al. .................... 362/602 |
| 2013/0182451 A1* | 7/2013 | Oba et al. ...................... 362/503 |
| 2014/0003075 A1* | 1/2014 | Yamada et al. ............... 362/511 |
| 2014/0003076 A1* | 1/2014 | Suganumata et al. ........ 362/511 |

FOREIGN PATENT DOCUMENTS

| | | |
|---|---|---|
| FR | 2 948 609 | 2/2011 |
| WO | 2004/082934 | 9/2004 |

OTHER PUBLICATIONS

U.S. Appl. No. 14/351,991, filed Apr. 15, 2014, Massault, et al.

* cited by examiner

LIGHT-SIGNALING GLAZING FOR A VEHICLE

BACKGROUND

The present invention relates to an illuminated signaling glazing unit for a vehicle, preferably for an automobile vehicle, comprising a system for illuminating via the edge face of the glazing unit and means for rendering opaque preventing the emission of the light toward the inside of the vehicle.

In the field of automobile vehicles, doubling up certain signaling lights such as the rear lights, direction indicator lights, stop lights or reversing lights, with light sources that are synchronized with these signaling lights and have the same color as the latter is a known technique. These light sources may be placed on the vehicle body, on the wing mirror (indicator light flasher) or else inside the passenger compartment, generally near the rear window, as described for example in the application EP 1 234 752. In the glazing unit described in this document, light-emitting diodes (LEDs) are placed in a unit situated around the periphery of the glazing unit on the inside face of the latter. These LEDs are therefore facing a main face of the glazing unit and are visible through an clear opening left in the surrounding enamel.

Such a doubling up of the signaling lights involves one or more additional components to be managed in the production line and, as a result, increases the costs of production. Furthermore, these additional, "displaced", signaling lights are not always totally satisfactory from an aesthetic point of view. The present invention is based on the idea of integrating the additional signaling function directly into one or more glazing units of the vehicle, for example into the rear window or the front or rear fixed side windows of the vehicle.

Such an integration of additional light sources, which could be flashing, into the windows of a car poses however serious problems of road safety. This is because no red light must be emitted toward the front of the vehicle, nor any white light, with the exception of the reversing lights, toward the rear of the vehicle.

Furthermore, the light emitted by the direction indicator lights (indicators and indicator flashers) must only be visible from the side where the direction indicator light in question is situated. If light were emitted by windows toward the inside of the vehicle, there is a risk that it could, by transparency, also be visible on the outside of the latter. The flashing of the left indicator light flasher, for example, could then be interpreted, in certain situations, by the driver of another vehicle, as coming from the right side, and vice versa.

It will also be understood that the visibility, by the driver, of the direction indicator lights of his own car could be very distracting in certain situations, notably while driving at night or when this light is reflected on glazing units or other reflecting surfaces inside of the vehicle.

In order to be certified, such illuminated signaling glazing units must therefore comprise masking elements preventing the light from penetrating into the interior of the passenger compartment, preferably without reducing excessively or undesirably the glass clarity.

SUMMARY

The present application provides an illuminated signaling glazing unit where these technical and safety objectives have been achieved thanks to relatively simple and low-cost technical means which are very satisfactory from an aesthetic point of view.

One subject of the present application is accordingly an illuminated signaling glazing unit for a vehicle, comprising
- a first transparent sheet made of mineral glass, with a first main face intended to be directed toward the outside of the vehicle, a second main face intended to be directed toward the inside of the vehicle, and an edge face,
- one or more light sources, preferably light-emitting diodes (LED), each having a light-emission face opposite the edge face, the light emitted by the light sources being thus guided in the first sheet between the first and the second main face of the latter,
- a means for extraction of the light in at least one region of the first main face or of the second main face of the first sheet or in the thickness of the first sheet, and
- an opaque layer formed from ink or from enamel, in contact with the means for extraction of the light and/or with at least one of the main faces of the sheet or of one of the sheets of the glazing unit, said opaque layer being situated toward the inside of the vehicle with respect to the extraction means and totally masking the means for extraction of the light in such a manner as to render it invisible from the inside of the vehicle.

The glazing unit of the present invention can be a single-piece glazing unit, preferably made of dip-coated glass, or a laminated glazing unit comprising at least two single sheets bonded to each other in a known manner by means of a sheet separating interface. It is important to note that, in the description hereinafter of the glazing unit of the present invention, the term "first sheet" will always denote the sheet of glass illuminated on its edge face by the light source or sources, independently of its position with respect to the second sheet. In other words, the first sheet ("illuminated" sheet) can be that in contact with the outside or with the interior of the vehicle, and can be doubled up by a second sheet on its face respectively oriented toward the interior or toward the outside of the vehicle.

Of course, when the glazing unit is a single-piece glazing unit, the "first sheet" is the one and only glass sheet of the glazing unit.

When the illuminated signaling glazing unit of the present invention is a laminated glazing unit, it comprises, in addition to the first sheet, a second transparent sheet, also made of organic or mineral glass, with a first main face directed toward the outside of the vehicle, and a second main face directed toward the inside of the vehicle, said second sheet being fixed to the first sheet by means of a transparent sheet separating interface. This sheet separating interface is in adhesive contact (a) either with the second main face of the first sheet and the first main face of the second sheet,
(b) or with the first main face of the first sheet and the second main face of the second sheet.

In the variant (a), the sheet illuminated by its edge face (first sheet) is the sheet in contact with the outside air. This variant offers the advantage of a good illumination efficiency for the glazing unit because the light emitted toward the outside will not be absorbed at all by the separation interface or the second sheet. It does however have the drawback that scratches or dirt, which could be present on the first main face of the first sheet (external face of the glazing unit), will be highly visible when they are illuminated by the LED situated on the edge face of the first sheet.

It is for this reason that the variant (b), corresponding to the embodiment where the illuminated sheet is that which is in contact with the air of the passenger compartment of the vehicle, will generally be preferred with respect to the variant (a), despite a potential reduction in the illumination efficiency.

For the first sheet, colorless soda-lime mineral glass such as the glass Planilux® marketed by the applicant will preferably be used. The first sheet typically has a thickness in the range between 2.5 and 6 mm when used as a single-piece glazing unit, and a thickness in the range between 1.4 and 3.2 mm, preferably between 1.4 and 2.1 mm when for a laminated glazing unit.

When the second sheet is bonded onto the external face of the first sheet, it is preferably as transparent and colorless as the first sheet. In one preferred embodiment, a laminated glazing unit according to the invention will be composed of two colorless Planilux® sheets, joined together by means of a tinted sheet separating interface.

When it is bonded onto the internal face of the first sheet, it can, on the contrary, be made of tinted glass, for example the glass Venus®, TSA3+ or TSA4+ also marketed by the applicant. Although the laminating of two sheets with different tints poses, at the present time, various drawbacks associated with the glass fabrication process, this embodiment could become particularly advantageous when these problems have been overcome.

The second sheet typically has a thickness in the range between 1.4 and 2.1 mm.

The separation interface can be composed of any kind of polymer material commonly used for this function. By way of example of such materials, the following may be mentioned: poly(vinylbutyral) (PVB), plastified polyurethane and co-polymers of ethylene and vinylacetate (EVA), potentially partially hydrolyzed. The separation interface typically has a thickness in the range between 0.2 and 1.1 mm and may be colorless or tinted.

The light emitted by the light sources enters via the edge face of the first sheet which acts as waveguide.

In order to "extract" the light from the waveguide, numerous extraction means exist that are well known to those skilled in the art and widely used in the field of glazing. The means for extraction of the light may, for example, be a roughened area of the first sheet or else a diffusive coating applied to one of the main faces of the first sheet or else to the face of the sheet separating interface in contact with the first sheet. The means could also be a region etched into the thickness of the first sheet or again scattering elements, such as particles or glass fibers, incorporated into the separation interface.

As diffusive coating, any diffusive coating commonly used in the field of glazing may be used. Such a coating generally comprises particles having a size of the order of a micrometer and an organic or mineral binder allowing these particles to adhere to the surface of the glass. The particles can be made of metal or a metal oxide. Their average size is typically in the range between 50 nm and 1 micrometer. A suitable diffusive coating is described for example in the international application WO 01/90787.

In an embodiment of the present invention, the opaque masking layer is made of enamel. Those skilled in the art are familiar with the application of opaque enamels, generally with a black color, on the edges of automobile glazing units.

For the fabrication of two congruent layers, one having a clear color (means for extraction of the light) and the other having a darker color, potentially black (opaque layer), reference may be made to the application US2006/0150680. The application EP0636588 describes the fabrication of metalized enamels which, due to their reflective nature, can be particularly advantageous for the present invention.

In another embodiment of the glazing unit of the present invention, the opaque masking layer is composed of ink. Since this ink does not generally need to be subjected to temperatures as high as the enamel, the use of an ink allows additional application possibilities. Indeed, the ink may be applied by printing, for example by serigraphy, on one of the main faces of the first or of the second sheet, but it may also be applied on one of the faces of the sheet separating interface which will, after assembly, be in direct contact with one of the main faces of the sheets of glass.

Black inks for printing on glass are known to those skilled in the art. Printing on the sheet separating interface with black inks is described for example in the French application filed by the applicant on the 12 Apr. 2011 under the number 11 53189.

Various configurations for the means for extraction of the light and the means for rendering opaque may be envisioned. These two elements, essential for the invention, may be in contact with each other, or else they can be separated for example by one of the sheets of glass and/or by the sheet separating interface. In any case, the opaque masking layer is of course situated more toward the inside of the vehicle than the extraction means, otherwise it would not be able to fulfill the role of screen for the light.

In an embodiment of the glazing unit of the present invention, shown in FIG. 2, the means for extraction of the light is on the second main face of the first sheet, and the opaque layer is directly in contact with the means for extraction of the light and completely covers it. The opaque layer can have the same size and shape as the extraction means and may be perfectly superimposed on the latter, or else it may be larger than the latter and overlap the limit of the latter. In one preferred embodiment, the two layers (extraction means and means for rendering opaque) are deposited on top of each other on the second main face of the first sheet. However, the deposition may also be envisioned of the means for extraction of the light onto the second face of the first sheet and the deposition of an opaque ink (means for rendering opaque) onto at least one of the faces of a sheet separating interface, where present, which will subsequently be brought into contact with the first sheet in such a manner that these two depositions are superposed.

In a second embodiment of the glazing unit of the present invention, shown in FIG. 1, the means for extraction of the light is on the first main face of the first sheet and the means for rendering opaque is on the second main face of the first sheet. In this embodiment where the opaque layer is not directly in contact with the means for extraction of the light, the offset between these two layers (thickness of the first sheet) risks reducing the effectiveness of masking of the light by the opaque layer. In this embodiment, it is consequently particularly advantageous for the extent of the opaque layer to be greater than that of the extraction means and to overlap the latter on its periphery.

A further embodiment of the glazing unit of the present invention, shown in FIG. 3, only relates to laminated glazing units. In this embodiment, the illuminated sheet (=first sheet) is the sheet in contact with the outside air, in other words the second sheet is fixed to the first sheet by means of the sheet separating interface which is in adhesive contact with the second face of the first sheet and the first main face of the second sheet, and the means for extraction of the light is on at least one of the main faces of the first sheet and the means for rendering opaque is on at least one of the main faces of the second sheet. As for the embodiment shown in FIG. 1, it is particularly advantageous here for the extent of the layer for rendering opaque to be greater than that of the extraction means and to overlap the latter around its whole periphery.

Lastly, a final advantageous embodiment is characterized in that the second sheet is fixed to the first sheet by means of the sheet separating interface which is in adhesive contact with the first main face of the first sheet and the second main face of the second sheet, and the means for extraction of the light is on the first main face of the first sheet and the opaque layer is on the second main face of this first sheet.

The means for extraction of the light can take the form of a single continuous region, of any given shape, or else it may be composed of several separate regions. The same is of course true for the opaque layer. When the extraction means is present in the form of several separate regions, the opaque layer can be a single region surrounding all of these regions, as illustrated in FIG. 1.

As explained hereinabove, when the opaque layer is not in direct contact with the extraction means, it preferably has a greater extent than the latter. Generally speaking, the total extent of the region or of the regions covered by the opaque layer is greater by at least 5%, preferably by at least 10% and, in particular, by at least 20%, than the total extent of the region or of the regions covered by the means for extraction of the light.

On the other hand, when these two layers are in contact with each other, they can be congruent (in other words of the same shape and size) and superposed one on top of the other.

Although it may in principle be envisioned in certain cases, for example for the deflector or the quarter-light (side windows fixed onto the vehicle body, at the front and at the rear of the vehicle, respectively), for the whole surface of the glazing unit to be covered with an opaque layer, it is generally indispensible, notably for the rear window and some side windows, for the glazing unit to comprise at least one transparent region, known as "window to clear-view", not covered by the opaque layer.

This window clear-view generally represents at least 20%, preferably at least 50% and in particular at least 70%, of the total surface area of the glazing unit, including the regions covered by the encapsulation or the joints. In other words, the opaque layer covers a region that generally represents at the most 80%, preferably at the most 50% and in particular at the most 30%, of the total surface area of the glazing unit.

As was mentioned hereinbefore, the enamel and the ink forming the means for rendering opaque can be both reflective and opaque. When they are not reflective and absorb the majority of the light, it may be advantageous, for obvious reasons of illumination efficiency, to interpose a reflecting layer, preferably a thin metal layer, between the means for extraction of the light and the means for rendering opaque.

"Opaque layer", in the present application, is understood to mean a layer having an optical density equal to at least 2. The optical density of the opaque layer is preferably in the range between 2.5 and 5, more preferably between 2.8 and 4.5 and, in particular, between 3 and 4.

When the opaque layer is doubled up, on its face turned toward the means for extraction of the light, by a reflecting layer, for example by a thin metal layer, it suffices for the assembly of these two layers to have the optical densities hereinabove.

Another subject of the present invention is a vehicle, preferably an automobile vehicle, comprising at least one illuminated signaling glazing unit such as described hereinbefore.

The function that the signaling glazing unit will fulfill will then depend on its position in the vehicle and on the color of the light emitted by the means for extraction of the light.

When it is designed to operate as a direction indicator light, the glazing unit according to the invention emits a light of auto yellow color (see Council Directive n° 76/759/CEE of the 27 Jun. 1976, Appendix V). It is then situated on the rear window when it is a rear indicator (category 2), on a side window when it is an indicator light flasher (category 5), or on the windshield when it is a front indicator light (category 1).

In an analogous manner, the glazing unit will emit a red light when it operates as a rear stop light, and a white light when it acts for example as a reversing light. In these two cases, the glazing unit of course corresponds to the rear window.

The color of the light emitted by the glazing unit, and more precisely is by the means for extraction of the light, may be determined by, amongst other things,
    the emission spectrum of the light sources,
    the absorption spectrum of the first sheet (waveguide for the light received from the light sources),
    a tinted sheet separating interface in adhesive contact with the first face of the first sheet, or
    the absorption/emission spectrum of the material forming the means for extraction of the light.

By way of examples of preferred embodiments, the following may be mentioned:
    an LED with an auto yellow color in combination with a first untinted sheet and a white extraction material;
    an LED with an auto yellow color in combination with a first untinted sheet and an orange or yellow extraction material;
    an LED with a white color in combination with a first untinted sheet and an orange or yellow extraction material.

The use of an LED emitting UV radiation in combination with an extraction material of the fluorescent luminophore type may also be envisioned.

It goes without saying that, irrespective of the function to be fulfilled by the illuminated signaling glazing unit of the present invention, the light sources will need to have an electrical power supply system, either stand-alone or attached to the electrical system of the car. The light sources will furthermore need to be configured in such a manner as to be able to receive control signals switching them on/off.

In one preferred embodiment of the vehicle of the present invention, the illuminated signaling glazing unit is a direction indicator light, capable of emitting a flashing auto yellow light. This is preferably an indicator light flasher (direction indicator light of category 5; Council Directive n° 76/759/CEE of the 27 Jun. 1976) situated on the deflectors or the front fixed side windows.

In order to guarantee a satisfactory illumination power, in the range between 0.3 and 200 cd seen from an angle in the range between 5 and 55° with respect to the reference axis of the vehicle (see directive n° 76/759/CEE), the emission faces of the light sources are preferably opposite the edge face of the first sheet positioned toward the front of the vehicle.

BRIEF DESCRIPTION OF THE DRAWINGS

The present invention will now be described with reference to the appended figures in which.

DETAILED DESCRIPTION

Figure 1:
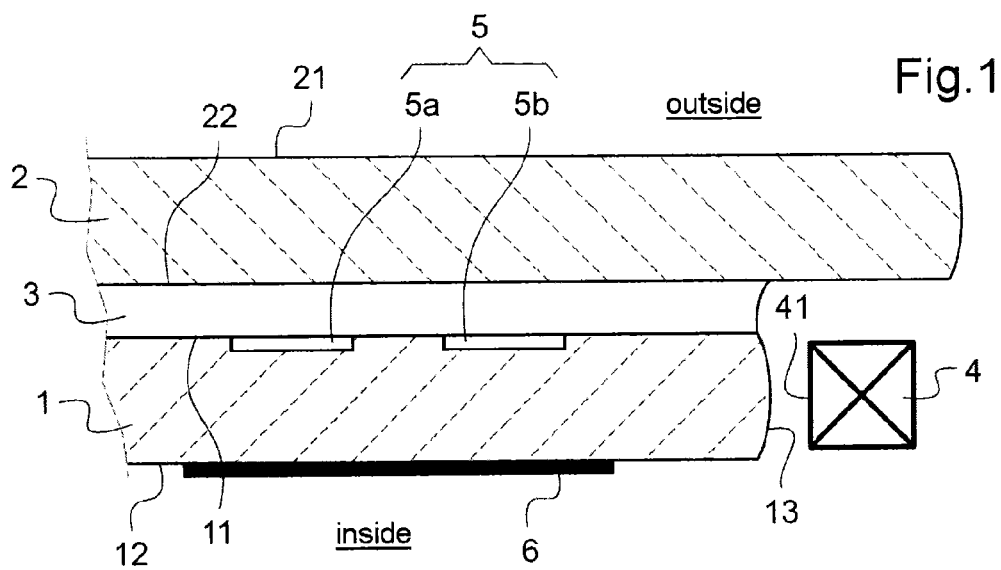
FIG. 1 is a schematic cross-sectional representation of a first embodiment of a glazing unit according to the invention.

More particularly, FIG. 1 shows the edge of a laminated glazing unit as a cross-sectional view. A second sheet 2, in contact via its first main surface 21 with the outside air, is bonded by means of a sheet separating interface 3 to a first sheet 1, illuminated by its edge face 13. The sheet separating interface is in adhesive contact with the second main face 22 of the second sheet and with the first main face 11 of the first sheet. The second main face 12 of the first sheet 1 is in contact with the inside air of the vehicle. A light-emitting diode (LED) 4 is positioned near to the edge face 13 of the first sheet 1, its emission face 41 being opposite this edge face. The means for extraction of the light 5 is here made up of two regions 5a, 5b etched into the surface of the first main face 11 of the first sheet 1. The opaque layer 6, an enamel applied onto the second main face 12 of the first sheet, has a much greater extent than the two etched regions 5a, 5b and covers an area which encompasses these two individual regions.

Figure 2:
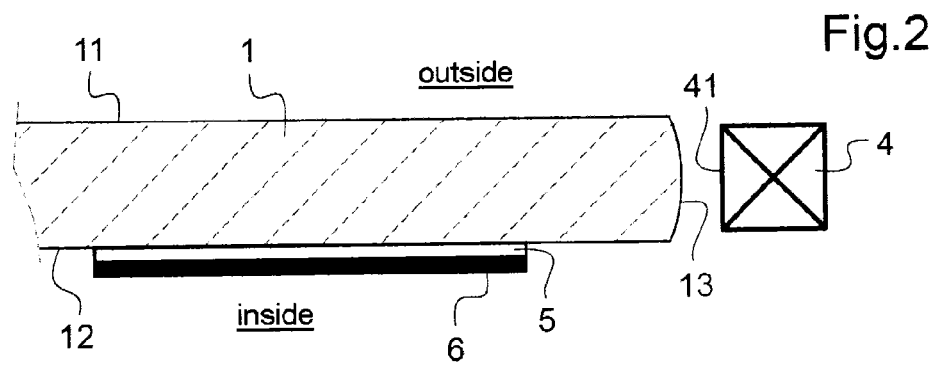
FIG. 2 is a schematic cross-sectional representation of a second embodiment of a glazing unit according to the invention and FIG. 3 is a schematic cross-sectional representation of a third embodiment.

FIG. 2 shows the edge of a single-piece glazing unit according to the invention as a cross-sectional view. The glazing unit comprises a single sheet 1, called first sheet, with a first main face 11 in contact with the outside air, a second main face 12 in contact with the inside of the vehicle, and an edge face 13. The emission face 41 of an LED 4 is opposite the edge face 13. The means for extraction of the light 5 is in direct contact with the second main face 12 of the sheet 1. The extraction means 5 is covered, over its whole surface, by an opaque layer 6. The latter has exactly the same shape and size as the means for extraction of the light 5 and is superposed onto the latter without however overlapping its periphery.

Figure 3:
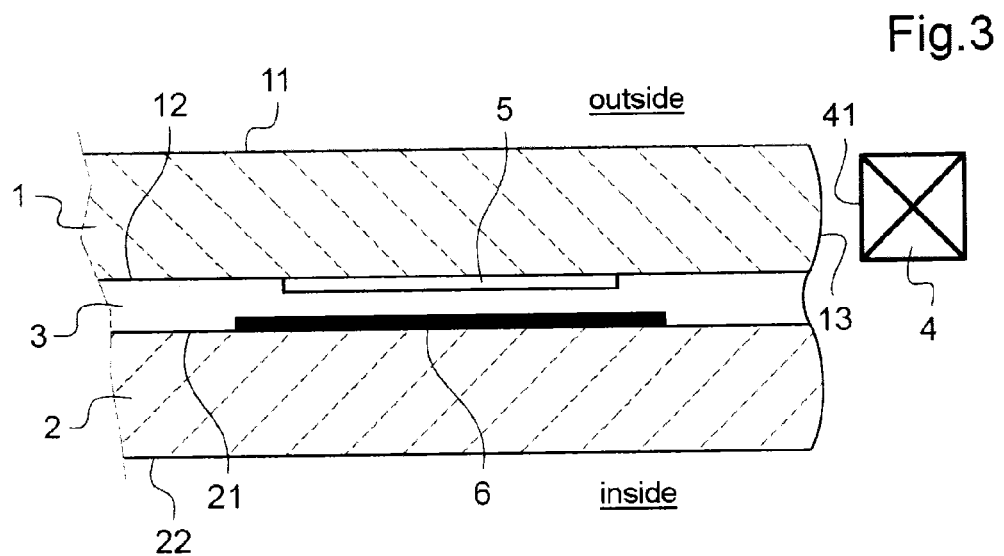

FIG. 3 shows one embodiment where the means for extraction of the light 5 and the opaque layer 6 are on two different sheets of a laminated glazing unit. The extraction means 5 is situated on the second main face 12 of the first sheet 1, illuminated by the LED 4. The opaque layer 6 is in contact with the first main face 21 of the second sheet 2 and also with the sheet separating interface 3. The opaque layer 6 can be formed from an enamel or from an opaque ink deposited on the face 21, or else may be a layer of ink printed onto the sheet separating interface 3. As for FIG. 1, the spatial separation of the means for extraction of the light 5 and of the opaque layer 6 justifies a larger size of the opaque layer 6 with respect to the extraction means 5.

Figure 4A:
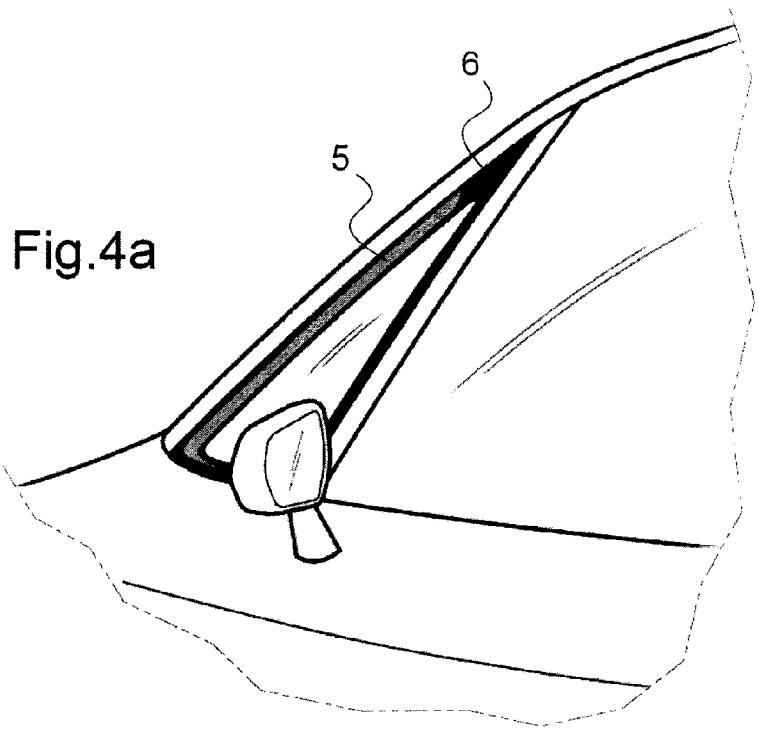
FIGS. 4a and 4b are an illustration of a fixed front side glazing unit playing the role of indicator light flasher.
Figure 4B:
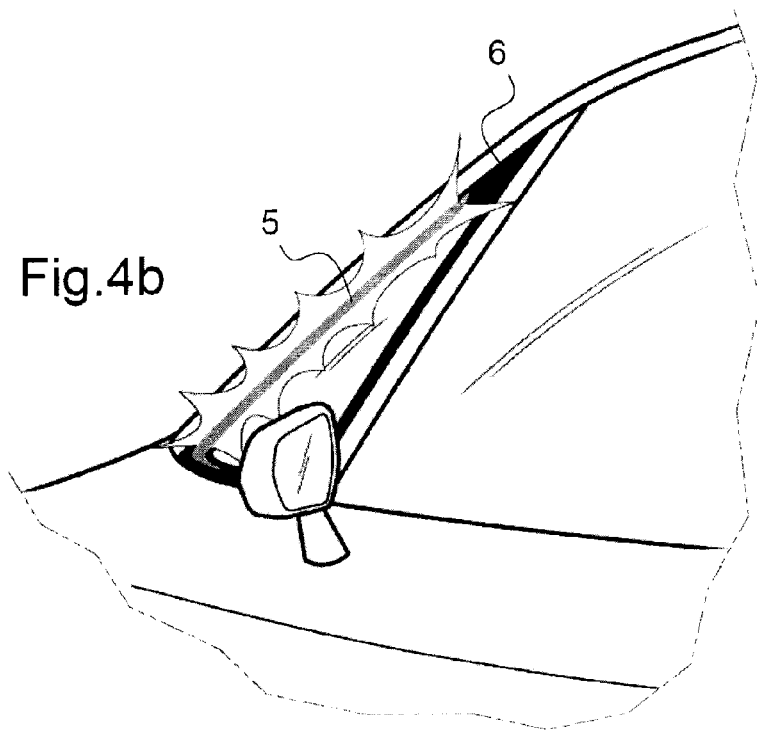

FIGS. 4a and 4b illustrate a particular illuminated signaling glazing unit in the off and on state, respectively. This is an indicator light flasher in the form of a fixed front side window of an automobile vehicle. The light sources, not shown, are situated opposite the edge face of the window, positioned toward the front of the vehicle. The means for extraction of the light 5 is a single region with an elongated shape close to the light sources. An opaque layer 6, with a greater extent than the extraction means, effectively prevents the light scattered by the extraction means from penetrating inside the vehicle.

The invention claimed is:

1. An illuminated signaling glazing unit for a vehicle, comprising:
 a first transparent sheet made of mineral glass, including a first main face configured to be directed toward outside of the vehicle, a second main face configured to be directed toward inside of the vehicle, and an edge face;
 one or more light sources, or light-emitting diodes, each including a light-emission face opposite the edge face, light emitted by the light sources being guided into the first sheet between the first and the second main face of the first sheet;
 a means for extraction of the light in at least one region of the first main face or of the second main face of the first sheet or within a thickness of the first sheet; and
 an opaque layer formed from ink or from enamel, the opaque layer being situated toward the inside of the vehicle with respect to the means for extraction and totally masking the means for extraction of the light, to render the means for extraction invisible from the inside of the vehicle.

2. The glazing unit as claimed in claim 1, further comprising:
 a second transparent sheet made of mineral glass, including a first main face configured to be directed toward the outside of the vehicle, and a second main face configured to be directed toward the inside of the vehicle, the second sheet being fixed to the first sheet by a transparent sheet separating interface in adhesive contact either with the second main face of the first sheet and the first main face of the second sheet, or with the first main face of the first sheet and the second main face of the second sheet.

3. The glazing unit as claimed in claim 1, wherein the means for extraction of the light is on the second main face of the first sheet, and the opaque layer is directly in contact with the means for extraction of the light completely covering the means for extraction, or overlapping limits of the means for extraction.

4. The glazing unit as claimed in claim 1, wherein the means for extraction of the light is on the first main face of the first sheet and the opaque layer is on the second main face of the first sheet.

5. The glazing unit as claimed in claim 2, wherein the second sheet is fixed to the first sheet by the sheet separating interface which is in adhesive contact with the second face of the first sheet and the first main face of the second sheet, and the means for extraction of the light is on at least one of the main faces of the first sheet and the opaque layer is on at least one of the main faces of the second sheet.

6. The glazing unit as claimed in claim 2, wherein the second sheet is fixed to the first sheet by the sheet separating interface which is in adhesive contact with the first main face of the first sheet and the second main face of the second sheet, and the means for extraction of the light is on the first main face of the first sheet and the opaque layer is on the second main face of the first sheet.

7. The glazing unit as claimed in claim 1, wherein a total extent of a region or of regions covered by the opaque layer is greater by at least 5%, or by at least 10%, or at least 20%, than a total extent of the region or of the regions covered by the means for extraction of the light.

8. The glazing unit as claimed in claim 1, wherein the means for extraction of the light and the opaque layer are congruent and superposed one on top of the other.

9. The glazing unit as claimed in claim 1, wherein the opaque layer covers a region that represents at most 80%, or at most 50%, or at most 20%, of a total surface area of the glazing unit.

10. The glazing unit as claimed in claim 1, further comprising a reflecting layer, or a metal layer, situated between the means for extraction of the light and the opaque layer.

11. The glazing unit as claimed in claim 1, wherein the opaque layer has an optical density in a range between 2.5 and 5, or between 2.8 and 4.5, or between 3 and 4.

12. A vehicle comprising at least one illuminated signaling glazing unit as claimed in claim 1.

13. The vehicle as claimed in claim 12, wherein the illuminated signaling glazing unit is a direction indicator light.

14. The vehicle as claimed in claim 13, wherein the illuminated signaling glazing unit is an indicator light flasher.

15. The vehicle as claimed in claim 14, wherein emission faces of the light sources are opposite the edge face of the first sheet positioned toward a front of the vehicle.

* * * * *